United States Patent
Sundqvist

(10) Patent No.: US 6,752,173 B2
(45) Date of Patent: Jun. 22, 2004

(54) PLUG MEANS

(75) Inventor: Tommy Sundqvist, Lindome (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/248,145

(22) Filed: Dec. 20, 2002

(65) Prior Publication Data

US 2003/0066566 A1 Apr. 10, 2003

Related U.S. Application Data

(63) Continuation of application No. PCT/SE01/01390, filed on Jun. 19, 2001.

(30) Foreign Application Priority Data

Jun. 20, 2000  (SE) ............................................ 0002347

(51) Int. Cl.[7] ........................... F16L 55/10; G01F 23/04
(52) U.S. Cl. .......................... 138/89; 138/962; 33/722; 33/726; 220/801; 215/355
(58) Field of Search ................................. 138/89, 96 B, 138/109; 33/728, 722, 726; 220/212.5, 801, 805; 215/46, 396, 398, 399, 355

(56) References Cited

U.S. PATENT DOCUMENTS

| | | | | |
|---|---|---|---|---|
| 1,853,813 A | * | 4/1932 | Horsting | 33/728 |
| 2,588,188 A | * | 3/1952 | Weisman | 138/89 |
| 2,738,587 A | * | 3/1956 | Nelson | 33/728 |
| 3,889,714 A | * | 6/1975 | Wilger et al. | 138/89 |
| 4,911,193 A | * | 3/1990 | Smith | 137/15.15 |
| 5,113,594 A | * | 5/1992 | Ishihara et al. | 33/722 |
| 6,289,601 B1 | * | 9/2001 | Bricker | 33/726 |

* cited by examiner

Primary Examiner—Patrick Brinson
(74) Attorney, Agent, or Firm—Novak Druce LLP

(57) ABSTRACT

Plug means (10, 18) for lockable sealing of a passage opening with a support surface (19) intended for positioning the plug means. Simple lockability and demountability are brought about by virtue of the plug means comprising a sealing plug (15) for interaction with the sides of the passage opening, a retaining means (12), connected to the sealing plug, for interaction with a hook means (20) connected to the passage, and a flexible resilient connecting element (14) between the sealing plug and the retaining means.

19 Claims, 2 Drawing Sheets

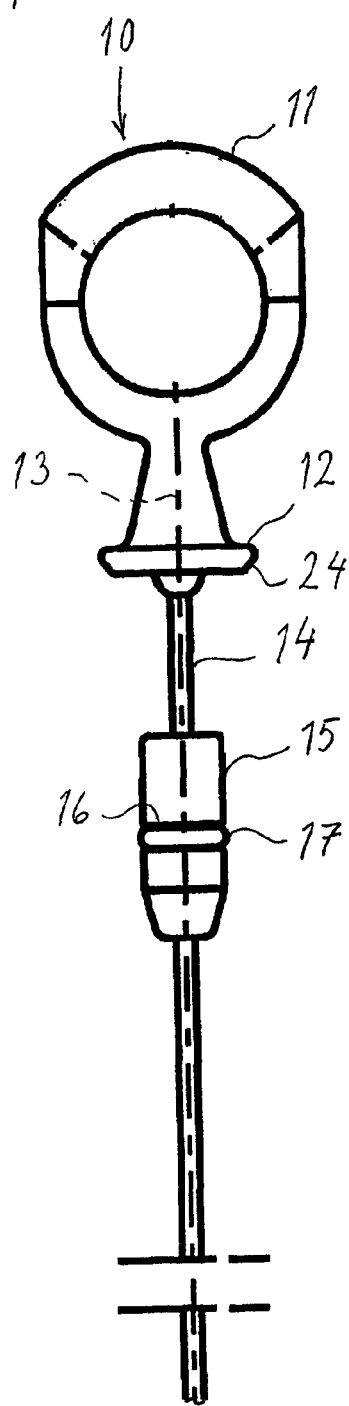
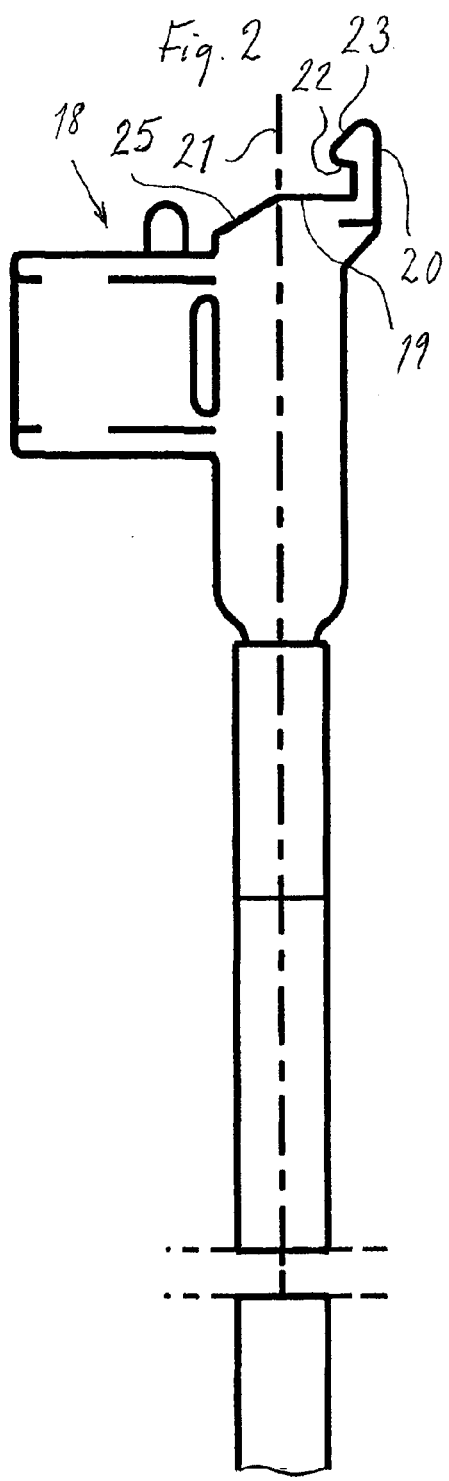

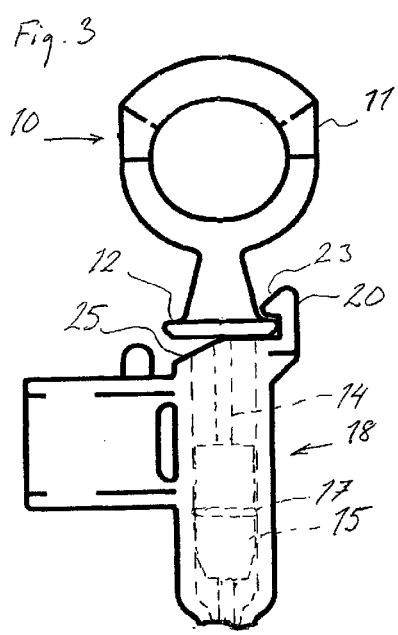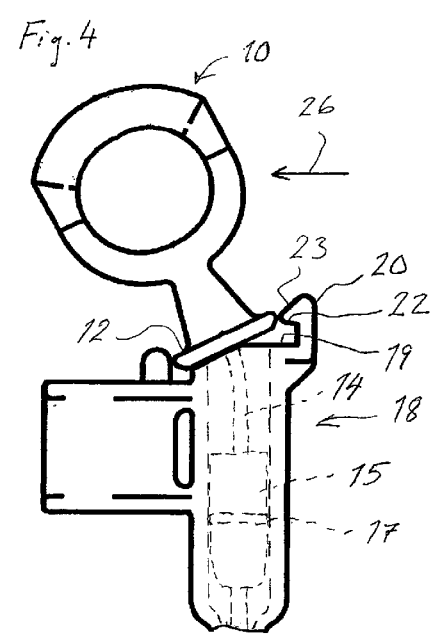

US 6,752,173 B2

PLUG MEANS

CROSS REFERENCE TO RELATED APPLICATIONS

The present application is a continuation of International Application No. PCT/SE01/01390, filed Jun. 19 2001, published in English pursuant to PCT Article 21 (2) and which claims priority to Swedish Application No. 0002347-3 filed Jun. 20 2000. Both applications are expressly incorporated herein by reference in their entireties.

BACKGROUND OF INVENTION

1. Technical Field

The present invention relates to plug means, arrangement or member for providing a lockable sealing function at a passage opening, and that has a support surface intended for properly positioning the plug means.

2. Background

Today's environmental requirements relating to internal combustion engines specify that crankcase ventilation of the engine should pass through oil-separation arrangements intended for such purpose. Additionally, the crankcase is to be designed so that the risk of leakage to the environment is minimized.

There are also fire safety requirements for flammable liquids such as engine oil specifying that such liquids should not be permitted to spread from a vehicle, even in the event of engine break-down or other trouble. In the event of an engine seizure, for example, great overpressures can arise inside the crankcase. To meet the requirements, it should not be possible for such overpressures to cause, for example, dipstick that extends down into the crankcase to be pressured out of its normal mounting position. Although the oil level in an internal combustion engine can be monitored electronically, it is still advantageous to be able to visually inspect the condition of the oil, and particularly, its level in the engine.

Dipsticks with locking means are known; for example, bayonet-style mounts and the like are known which make it possible to rotate the dipstick into a locking position. There is always a risk, however, that locking will not be correctly effected and the sealing function can be lost. Still further, the known plug means can be troublesomely unwieldy, and therefore it is desirable for a plug means of this nature to be easy to handle by an operator and adapted to be easily guided into and out of its locking position without difficulty.

SUMMARY OF INVENTION

An object of the present invention, therefore, is to produce a lockable plug means that is easy to demount (remove) and also to fit into a locked use configuration.

To this end, the present plug means is characterized by a sealing plug adapted for interaction with the sides of the passage opening and having a retaining means connected to the sealing plug for interaction with a hook means connected to the passage. A flexible and resilient connecting element is provided between the sealing plug and the retaining means. By virtue of this design of the plug means, the retaining means can easily be guided into or out of its retaining position against the action of the flexible resilient connecting element.

It should be appreciated that further advantageous and illustrative embodiments of the invention are possible, and in fact will emerge to those persons skilled in the art by way of the present disclosure.

BRIEF DESCRIPTION OF DRAWINGS

The invention is described in greater detail below, with reference to illustrative embodiments shown in the accompanying drawings, in which:

FIG. 1 is a partial side view of a dipstick that forms part of a plug means configured according to the present invention;

FIG. 2 is a partial side view of a mounting for the dipstick shown in FIG. 1;

FIG. 3 is a partial side view of the dipstick according to FIG. 1, mounted in a normal position of use the mounting shown in FIG. 2; and FIG. 4 shows the components of the dipstick illustrated in FIG. 3 in a released position in which the dipstick is about to be drawn out of the mounting.

DETAILED DESCRIPTION

The illustrative embodiment shown in the figures relates to a plug means in the form of a dipstick, but the invention can also be applied to other types of plug means.

FIG. 1 shows the upper part of a dipstick 10 which comprises a ring-shaped handle 11 which merges in its lower part with a flange-shaped retaining means 12 which is oriented transversely to the longitudinal axis 13 of the dipstick 10. The handle 11 is connected in a tension-proof manner to a flexible resilient steel cable 14 which is connected at its free end to a measuring stick for measuring the oil level, for example in the crankcase of an internal combustion engine.

A cylindrical sealing plug 15 is mounted coaxially on the cable 14 at a given suitable distance from the retaining means 12. The sealing plug 15 has a diameter that is adapted to fit with the diameter of the opening to be sealed. The plug 15 is also conically chamfered at the end thereby facilitating its introduction or installation into such an opening. The sealing plug 15 is also provided with a peripheral groove 16 that accommodates an O-ring 17 made, for example, of rubber.

A plug arrangement or plug means comprising (including, but not limited to) a cylindrical sealing plug 15 is mounted coaxially on the cable 14 at a given suitable distance from the retainer or retaining means 12. The sealing plug 15 has a diameter that is adapted to fit with the diameter of the opening to be sealed. The plug 15 is also conically chamfered at the end thereby facilitating its introduction or installation into such an opening. The sealing plug 15 is also provided with a peripheral groove 16 that accommodates an O-ring 17 made, for example, of rubber.

The tubular support 18 is provided with a support surface 19 that defines the end point of the insertion of the dipstick into the support. A hook means 20 is arranged at one side of the support surface of the tubular support 18 in such a manner that the flange portion 12 of the handle 11 can pass the hook means. This position is shown in FIG. 3 and means that the dipstick is secured in this position by a retaining surface 22 which extends transversely to the longitudinal axis 21 of the support 18, faces the opening of the support and is arranged so as to act against the upper side of the flange 12 of the handle 11. Introduction of the dipstick into this position is facilitated by virtue of the hook means being provided with a chamfered sliding surface 23. The flange portion of the handle is also provided with a chamfered sliding surface 24, directed downwardly in the figures. The sliding surfaces 23, 24 are suitably chamfered at an angle of, for example, approximately 45 degrees, but it should be appreciated that other angles are also possible.

The flexible and resilient portion of the cable 14 between the flange 12 and the plug 15 makes it possible for the handle to be displaced slightly in the lateral direction in relation to the longitudinal axis 21 of the tubular support. By virtue of this configuration, the dipstick can be fitted in its locking position without any appreciable resistance or difficulty. The locking is sufficiently strong to secure the dipstick safely even if a high overpressure arises momentarily in the crankcase.

FIG. 4 shows how the dipstick 10 can easily be freed from the locking position. This is made possible by virtue of the support surface 19 having a chamfering 25 on the diametrically opposite side of the opening of the tubular support in relation to the hook means 20. It is therefore possible to angle the handle, as FIG. 4 shows, in the direction of the arrow 26, the flange portion 12 then moving in the lateral direction until the flange edge can pass the tip of the hook means 20. A certain lateral force on the handle 11, in order to free the dipstick from the locking position, and also a tensile force are therefore required, which prevents the dipstick being freed from its locking position unintentionally.

It should be appreciated that the present invention is not to be considered as being limited to the illustrative embodiments described above, but a number of other variants and modifications are possible within the scope of the patent claims contained herein. For example, the connecting element does not have to be a steel cable, but can be replaced by, for example, a suitable plastic and/or rubber material.

What is claimed is:

1. A plug means for lockable sealing of a passage opening with a support surface intended for positioning the plug means, said plug means compromising a sealing plug for interaction with the sides of a passage opening, a retaining means connected to the sealing plug for interaction with a hook means connected to the passage, and a flexible resilient connecting element between the sealing plug and the retaining means; and the hook means is located at one side of the passage opening, and the support surface is provided with an oblique chamfer on the diametrically opposite side or the passage opening.

2. A plug means for lockable sealing of a passage opening with a support surface intended for positioning the plug means, said plug means comprising a sealing plug for interaction with the sides of a passage opening, a retaining means connected to the sealing plug for interaction with a hook means connected to the passage, and a flexible resilient connecting element between the sealing plug and the retaining means: and the retaining means is provided with a sliding surface chamfered essentially transversely to the center axis of the sealing plug and facing toward the sealing plug.

3. The plug means as recited in claim 2, wherein the sliding surface has an angle of chamfer of approximately 30 to 60 degrees.

4. The plug means as recited in claim 2, wherein the sliding surface has an angle of chamfer of approximately 45 degrees.

5. A plug means for lockable sealing of a passage opening with a support surface intended for positioning the plug means, said plug means comprising a sealing plug for interaction with the sides of a passage opening, a retaining means connected to the sealing plug for interaction with a hook means connected to the passage, and a flexible resilient connecting element between the sealing plug and the retaining means, the connecting element consists of a steel cable.

6. A plug means for lockable sealing of a passage opening with a support surface intended for positioning tile plug means, said plug means comprising a sealing plug for interaction with the sides of a passage opening, a retaining means connected to the sealing plug for interaction with a hook means connected to the passage, and a flexible resilient connecting element between the sealing plug and the retaining means, the connecting element is extended through the sealing plug are connected to a level stick for measuring a fluid level.

7. A plug arrangement for sealing of a passage opening with a support surface configured for positioning the plug arrangement at the passage opening, said plug arrangement comprising a retainer for interaction with a hook connected to the passage and connected to a sealing plug by a flexible resilient steel cable, said sealing plug thereby being suspended from said retainer and said sealing plug being configured for interaction with sides of the passage for establishing a seal therebetween when said plug arrangement is installed at the passage opening.

8. The plug arrangement as recited in claim 7, wherein said flexible resilient steel cable is the exclusive means for suspending said sealing plug from said retainer and said flexible resilient steel cable being configured to properly position said sealing plug with respect to the passage opening when said plug arrangement is arrangement is installed therein.

9. The plug arrangement as recited in claim 8, further comprising a hook arrangement located at one side of the passage opening and having a retaining surface projecting essentially transversely to a longitudinal axis of the passage opening and facing said opening.

10. The plug arrangement as recited in claim 8, further comprising a hook arrangement located at one of the passage opening and having a sliding surface chamfered essentially transversely to a longitudinal axis of the passage opening and facing in the opposite direction.

11. The plug arrangement as recited in claim 10, wherein the sliding surface has an angle of chamfer of approximately 30 to 60 degrees.

12. The plug arrangement as recited in claim 10, wherein the sliding surface has an angle of chamfer of approximately 45 degrees.

13. The plug arrangement as recited in claim 8, wherein a hook arrangement is located at one side of the passage opening and the support surface is provided with an oblique chamfer on the diametrically opposite side of the passage opening.

14. The plug arrangement as recited in claim 8, wherein the retainer comprises a retaining surface projecting essentially transversely to the longitudinal axis of the sealing plug and faces there away from.

15. The plug arrangement as recited in claim 14, wherein the retainer is provided with a sliding surface chamfered essentially transversely to a longitudinal axis of the sealing plug and faces the same.

16. The plug arrangement as recited in claim 15, wherein the sliding surface has an angle of chamfer of approximately 30 to 60 degrees.

17. The plug arrangement as recited in claim 15, wherein the sliding surface has an angle of chamfer of approximately 45 degrees.

18. The plug arrangement as recited in claim 8, wherein the flexible resilient steel cable extends through the sealing plug and is connected to a level stick for measuring a fluid level.

19. A plug arrangement for lockable sealing of a passage opening with a support surface intended for positioning the plug arrangement, said plug arrangement comprising a sealing plug for interaction with the sides of a passage opening, a retainer connected to the sealing plug for interaction with a hook connected to the passage, and a flexible resilient connecting element between the sealing plug and the retainer, the connecting element consists of a steel cable.

* * * * *